(12) United States Patent
Sai et al.

(10) Patent No.: US 9,273,989 B2
(45) Date of Patent: Mar. 1, 2016

(54) FOAM FILLED DIELECTRIC ROD ANTENNA

(71) Applicant: HONEYWELL INTERNATIONAL INC., Morristown, NJ (US)

(72) Inventors: Bin Sai, Zuid Holland (NL); Fouad Nusseibeh, Champlin, MN (US)

(73) Assignee: Honeywell International Inc., Morristown, NJ (US)

( * ) Notice: Subject to any disclaimer, the term of this patent is extended or adjusted under 35 U.S.C. 154(b) by 189 days.

(21) Appl. No.: 14/229,165

(22) Filed: Mar. 28, 2014

(65) Prior Publication Data

US 2015/0276459 A1 Oct. 1, 2015

(51) Int. Cl.
| | |
|---|---|
| *G01F 23/00* | (2006.01) |
| *G01F 23/28* | (2006.01) |
| *H01Q 13/00* | (2006.01) |
| *H01Q 9/30* | (2006.01) |
| *G01F 23/284* | (2006.01) |
| *H01Q 1/36* | (2006.01) |
| *H01Q 1/22* | (2006.01) |
| *H01Q 13/06* | (2006.01) |
| *H01Q 15/08* | (2006.01) |

(52) U.S. Cl.
CPC .......... *G01F 23/284* (2013.01); *H01Q 1/225* (2013.01); *H01Q 1/36* (2013.01); *H01Q 13/06* (2013.01); *H01Q 15/08* (2013.01); *Y10T 29/49016* (2015.01)

(58) Field of Classification Search
None
See application file for complete search history.

(56) References Cited

U.S. PATENT DOCUMENTS

| | | | | |
|---|---|---|---|---|
| 3,381,371 | A * | 5/1968 | Russell | H01P 11/00 264/272.11 |
| 3,411,111 | A * | 11/1968 | Meyers, Jr. | G01S 3/06 333/12 |
| 3,858,214 | A * | 12/1974 | Jones, Jr. | H01Q 25/001 333/122 |
| 3,931,625 | A * | 1/1976 | Chiron | H01Q 9/40 343/787 |
| 4,498,061 | A | 2/1985 | Morz et al. | |
| 5,166,698 | A | 11/1992 | Ashbaugh et al. | |
| 5,684,495 | A | 11/1997 | Dyott et al. | |
| 5,936,589 | A | 8/1999 | Kawahata | |
| 6,155,112 | A * | 12/2000 | Eckert | G01F 23/284 343/753 |
| 6,202,485 | B1 * | 3/2001 | Wien | G01F 23/284 324/642 |
| 6,549,174 | B2 * | 4/2003 | Kloefer | G01F 23/284 343/771 |
| 6,664,939 | B1 | 12/2003 | Olinyk et al. | |
| 6,825,798 | B2 * | 11/2004 | McGregor | G01F 23/284 324/644 |

(Continued)

*Primary Examiner* — Peter Macchiarolo
*Assistant Examiner* — Jermaine Jenkins
(74) *Attorney, Agent, or Firm* — Jetter & Associates, P.A.

(57) ABSTRACT

An antenna combination includes a feed-through having an input side including a connector for coupling to a transmission line connector and an output side including an inner cavity attaching to an aperture in a top surface or a nozzle of a tank. A foam filled dielectric rod antenna is coupled to the output side of the feed-through having a nose portion including a sub-portion within the inner cavity and a rod-shaped portion from beyond the inner cavity to an antenna launch end. The rod-shaped portion includes an outer solid dielectric material including a thickness transition region, wherein a thickness of the solid dielectric material decreases toward the antenna launch end to a constant minimum thickness shell region that extends to the antenna launch end. The outer solid dielectric material defines an inner hollow region. A dielectric foam fill material fills the inner hollow region.

20 Claims, 5 Drawing Sheets

(56) References Cited

U.S. PATENT DOCUMENTS

| | | |
|---|---|---|
| 6,927,734 B2 | 8/2005 | Serban et al. |
| 7,518,548 B2 | 4/2009 | Edvardsson |
| 2002/0126061 A1 | 9/2002 | Griessbaum et al. |
| 2004/0080324 A1 | 4/2004 | Westerling et al. |
| 2012/0137768 A1 | 6/2012 | Edvardsson |
| 2015/0061947 A1* | 3/2015 | Manry, Jr. ............... H01Q 1/22 343/720 |

* cited by examiner

FOAM FILLED DIELECTRIC ROD ANTENNA

FIELD

Disclosed embodiments relate to dielectric rod antennas for level gauging.

BACKGROUND

Rod antennas or horn antennas are generally used for microwave-based level measurement systems for products in containers or storage tanks, which can also be used measure interfaces between different dielectric materials. Rod antennas have a narrow and elongated configuration which are suitable for storage tanks having a small opening or flange size and a sufficient height for accommodating the antenna. Horn antennas are wider and shorter as compared to rod antennas. Advantages of horn antennas include moderate directivity (gain), a low standing wave ratio (SWR), broad bandwidth, and simple construction and adjustment.

Horn antennas are usually the antenna of choice for high pressure radar gauging. In the case of a small tank opening (<4 inch or 10.2 cm), horn antennas with such small diameters lack the gain and half-power beam width (HPBW) to generally meet required system accuracy. Hollow dielectric rod antenna are also known for high pressure radar gauging.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize known hollow dielectric rod antennas for non-contact radar gauging have an antenna performance which is sensitive to contamination on the inner side of the hollow part of the antenna, therefore for disclosed embodiments the opening of the hollow part is closed to cope with possible contamination and condensation therein. Moreover, when exposed to high pressure environments (such as 10 bars=7,500 Torr=10 atm, to 160 bars) the hollow part of the dielectric antenna can deform or even collapse. To overcome these problems, for disclosed embodiments the hollow part of disclosed antennas is filled with a foam material that generally has a dielectric constant at 10 GHz from that of air at 1 atmosphere to less than (<) 1.2.

Disclosed antenna combinations include a feed-through coupled to a foam filled dielectric rod antenna (generally referred to hereafter as a "foam filled antenna"). The feed-through has an input side including a connector for coupling to a transmission line connector and an output side attaching to an aperture in top surface or a nozzle of a storage tank (hereafter generally a "tank"). The output side of the feed-through includes an inner cavity. The foam filled antenna is coupled to the output side of the feed-through including a sub-portion of its nose in the inner cavity of the feed-through, where the foam filled antenna is configured for launching electromagnetic (e.g., microwaves) waves into the tank and receiving reflected electromagnetic waves from a product material in the tank.

The foam filled antenna also includes a rod-shaped portion that defines an inner cavity, where a dielectric foam material fills the volume of inner cavity and extends to the antenna launch end opposite the nose portion. The dielectric foam fill material allows the foam filled antenna to withstand high pressure, such as up to 160 bars or more, which enables use for higher pressure application as compared to conventional hollow dielectric rod antennas. Disclosed dielectric antennas can include a dielectric end cover that together with the solid dielectric material can encapsulate the foam fill material.

Disclosed antenna combinations perform better as compared to conventional hollow dielectric antennas particularly when capped by a dielectric end cover which prevents contamination from entering inside antenna which can occur for conventional hollow dielectric rod antennas. Moreover, disclosed filling of the hollow region of the antenna with a dielectric foam fill material improves the antenna's performance compared to hollow dielectric rod antennas because the dielectric foam fill material acts as a lens to help focus EM waves. Disclosed antenna combinations can be applied to metal as well as non-metal tanks, and to tanks having a nozzle as well as to nozzle-less tanks.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Figure 1A:
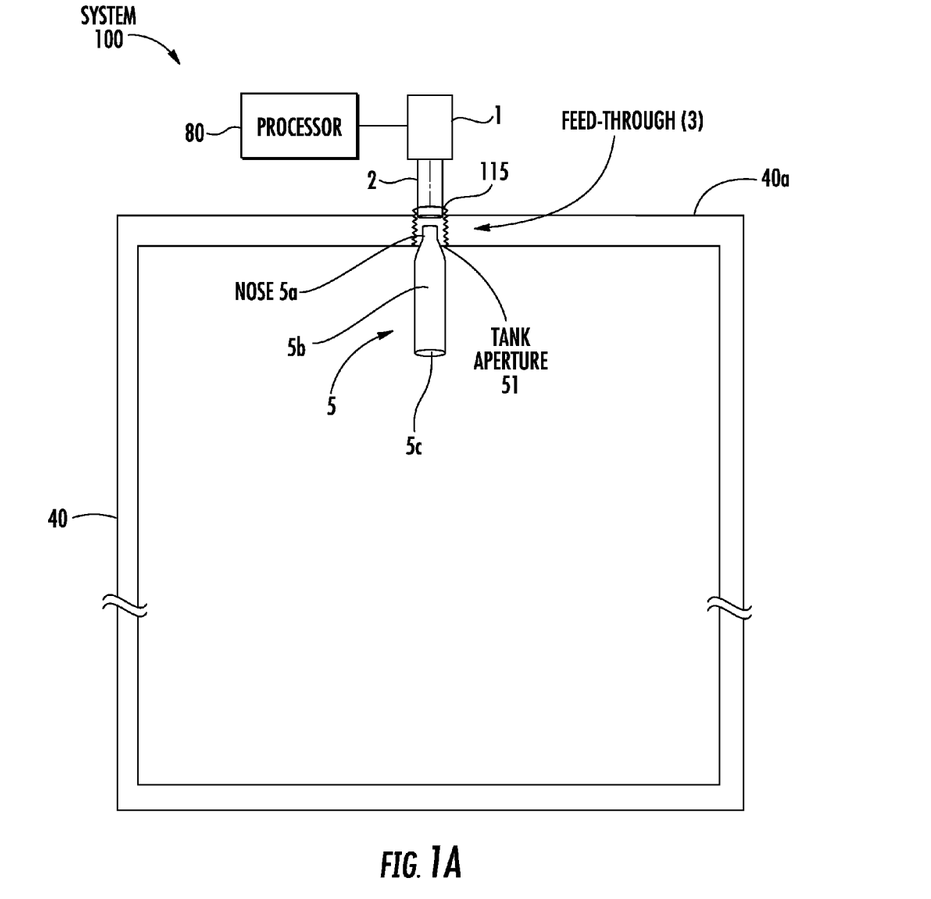
FIG. 1A shows a depiction of a non-contact radar system including an example antenna combination comprising a coaxial feed-through threaded to an aperture in a top surface of the tank and a disclosed foam filled antenna having a sub-portion of its nose portion within an inner cavity on the output side of the feed-through, according to an example embodiment.

FIG. 1A shows a depiction of a non-contact radar system 100 including an example antenna combination 3, 5 comprising a coaxial feed-through 3 threaded to a tank aperture 51 in a top surface 40a of a tank 40 and a disclosed foam filled antenna 5, according to an example embodiment. Feed-through 3 generally includes o-rings (not shown) which provide a seal to the tank aperture 51 in the top surface 40a of the tank 40. As known in the art, the tank aperture 51 can have a threaded aperture thereover, such as provided by an opening in a metal sheet for a non-metal tank or a threaded metal aperture for a metal tank, where "metal" is defined herein to include a metal, metal alloy or metal composite. The input side of the feed-through 3 includes connector 115 which is configured for receiving a process connection from another transmission line connector 2, such as from a coaxial cable.

The foam filled antenna 5 has a nose portion 5a that includes a sub-portion which is positioned within an inner cavity on an output side of the feed-through 3. The foam filled antenna 5 is configured for launching electromagnetic (e.g., microwaves) waves into the tank 40 and receiving reflected electromagnetic waves from a product (or products) material in the tank 40. The foam filled antenna 5 also includes a rod-shaped portion 5b comprising an outer solid dielectric material defining an inner hollow region shown extending from beyond the inner cavity to an antenna launch end opposite the nose portion 5a. Foam filled antenna 5 is shown including a dielectric end cover 5c that together with the solid dielectric material of rod-shaped portion 5b encapsulates the foam fill material of the foam filled antenna 5 (see foam fill material $5b_2$ in FIG. 2A and FIG. 2B described below).

The connector 115 receives a process connection from another transmission line connector 2 such as a coaxial cable, where the transmission line connector 2 is shown coupled to a transceiver 1 which is coupled to a processor (or controller) 80. The transmission line connector 2 can be a coaxial cable connector, a SubMiniature version A (SMA) or SMP interface, or a 2.92 mm/K connector. Regarding the impedance provided by the feed-through 3, the input feed point of the feed-through 3 is generally designed to match a standard 50 ohm impedance provided by the transmission line connector 2 (e.g., 50 ohm coaxial cable). The remainder of the feed-through 3 is generally designed to transition to the characteristic impedance of the foam filled antenna 5 that acts as a transformer having about a 50 ohm input impedance and a higher output impedance selected to match the air impedance of about 377 ohms.

Although not shown, between the transceiver 1 and the processor 80 there is a digital-to-analog converter (DAC) in the transmit path and an analog-to-digital converter (ADC) on the receive path. The feed-through 3 at its input side includes a coaxial portion comprising an inner conductor and an outer conductor having a connector configured for receiving the transmission line connector 2, and an output side including the outer conductor defining an inner cavity (see cavity 9 shown in FIG. 3 described below). The feed-through 3 is shown including threading which is threaded to the tank aperture 51 of the tank 40 which provides threading or includes a layer (e.g., a metal sheet) having threading. Tank 40 can be a metal or a non-metal (e.g., polymer-based or concrete) tank.

The feed-through 3 together with the foam filled antenna 5 of the antenna combination act as a lens that for transmitting receives electromagnetic energy from a process connection terminating in transmission line connector 2 in which a transverse electromagnetic field is propagating. In operation, system 100 determines the filling level of a product material in the tank 40 including liquids such as oil, or a solid material in powder or granular form such as grain. System 100 transmits pulsed microwave signals (e.g., using a carrier at about 6 GHz to 26.5 GHz depending on the application and the antenna design, and a pulse rate in the MHz range and generally about 0.5 ns to 2 ns wide) into the tank 40 and receives reflected signals from the tank 40 that are reflected by an interface between the product material and surrounding atmosphere, or an interface between different materials in the tank 40. The reflected signal is analyzed by the processor 80 to determine the distance to such an interface, using the "round trip" time of flight to determine the level of the product in the tank 40.

Figure 1B:
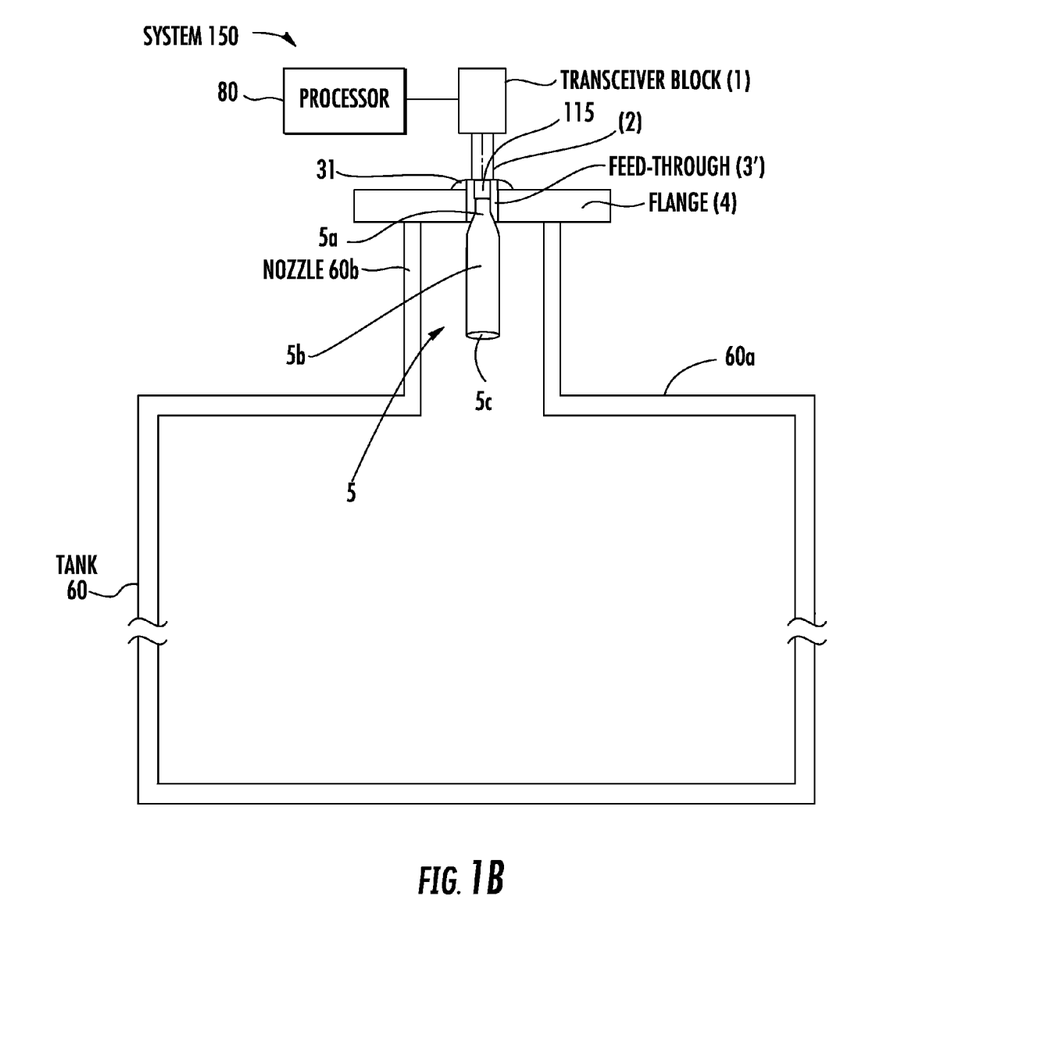
FIG. 1B shows a depiction of a non-contact radar system including an example antenna combination comprising a coaxial feed-through that has its outer conductor "sleeve" welded to a flange on a nozzle of a tank having an aperture and a disclosed foam filled antenna having a sub-portion of its nose portion within an inner cavity on the output side of the feed-through, according to an example embodiment.

FIG. 1B shows a depiction of a non-contact radar system 150 including an example antenna combination 3', 5 comprising a coaxial feed-through 3' that has its outer conductor "sleeve" welded by a weld material 31 to a metal flange 4 on a nozzle 60b on the top surface 60a of a tank 60, according to an example embodiment. The foam filled antenna 5 has a sub-portion of its nose portion 5a within an inner cavity at the output side of the feed-through 3'. In this embodiment the tank 60 is generally a metal or metal alloy tank and the nozzle 60b is a metal cylindrical tank nozzle. The metal flange 4 being electrically connected to the outer conductor of the feed-through 3' provides a ground for the antenna combination 3, '5 that is generally used by the other electrical components of the system 150. The launch end of the foam filled antenna 5 includes an end cover 5c comprising a solid dielectric material.

Figure 2A:
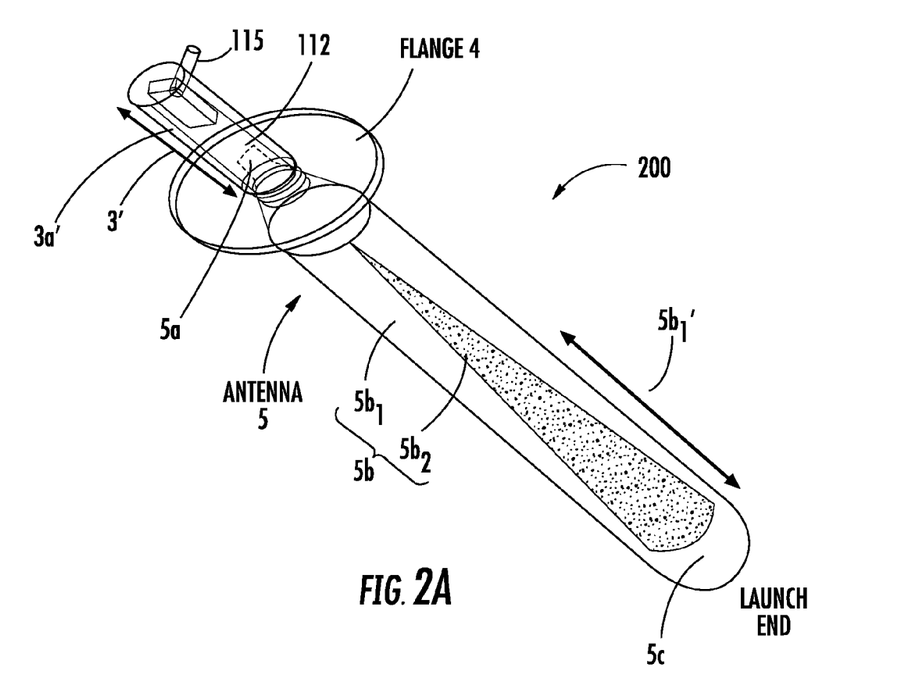
FIG. 2A is a perspective partially sectional depiction of an example antenna combination having a disclosed foam filled antenna, according to an example embodiment.
Figure 3:
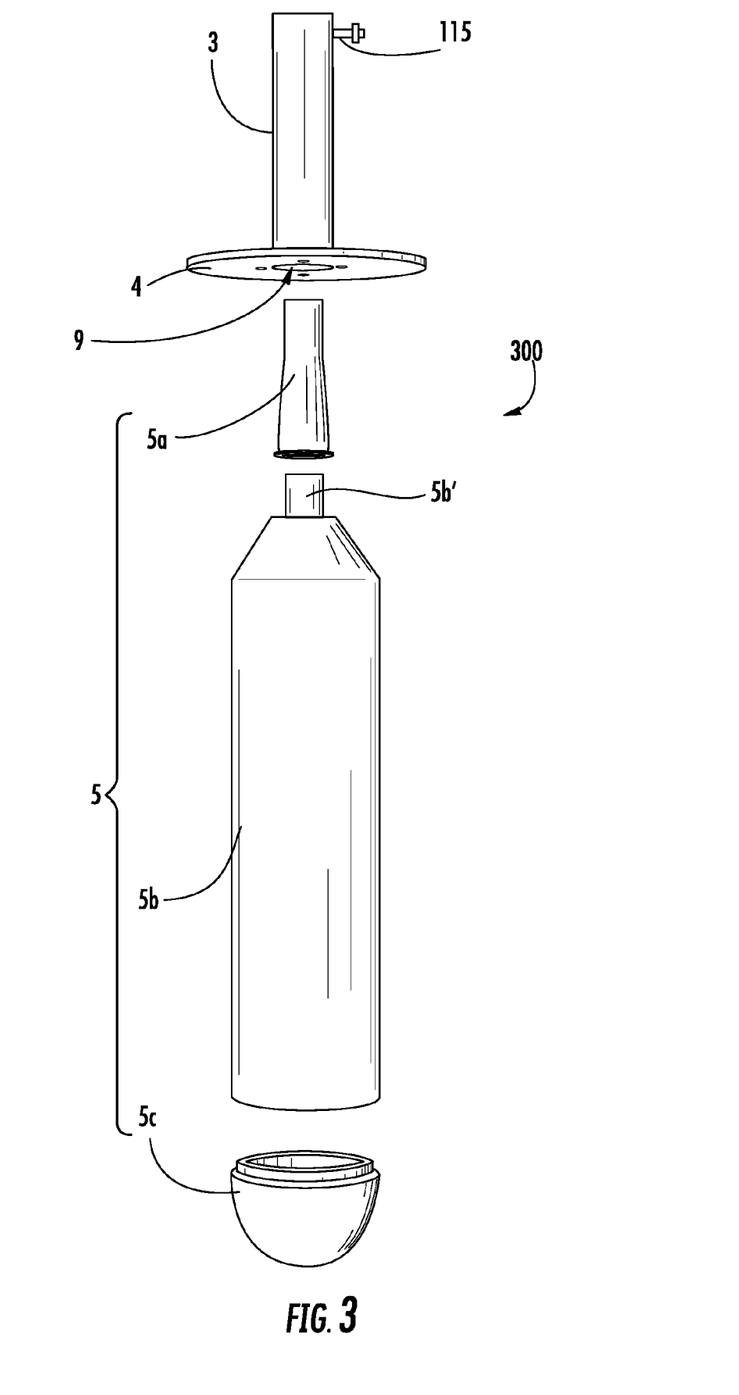
FIG. 3 is an exploded view of an example antenna combination including a disclosed foam filled antenna, according to an example embodiment.

FIG. 2A is a perspective partially sectional depiction of an example antenna combination 200, according to an example embodiment. The foam filled antenna 5 shown includes a nose portion 5a including a sub-portion thereof positioned in the inner cavity of the feed-through 3'; and a rod-shaped portion 5b extending from beyond the inner cavity of the feed-through 3' to an antenna launch end opposite the nose portion 5a. Although generally described as separate portions, in practice the feed-through 3' (without its outer metallic conductor 112) and the nose portion 5a and rod shape portion 5b of the foam filled antenna 5 can be in one piece, rather than separate pieces as shown in FIG. 3 described below.

The feed-through 3' is shown including a connector 115 that couples to the transmission line connector 2 (e.g., a coaxial cable). The outer metallic conductor 112 of the feed-through 3' is electrically connected to the flange 4, typically by a weld material, which provides a ground that is common with a system ground used by the other system components including processor 80, transceiver 1 and transmission line connector 2. As described above, a transmit electrical signal is fed at the feed point (connector 115) of the feed-through 3 which is configured to transform the electrical signal to electromagnetic fields that reach the output end of the foam filled antenna 5 which is then launched into free space within the tank 40 as a transverse electromagnetic waves.

The rod-shaped portion 5b of the foam filled antenna 5 includes an outer solid dielectric material $5b_1$ which provides a thickness transition region shown tapered for providing an impedance transition with increasing impedance toward the launch end. However, a stepped thickness arrangement also possible as an alternative for a tapered arrangement. The thickness of the solid dielectric material $5b_1$ is shown to decrease toward the antenna launch end to a constant minimum thickness shell region that extends to the antenna launch end. The outer solid dielectric material $5b_1$ also defines an inner hollow region $5b_2$ that is filled with a dielectric foam fill material. The foam filling is generally such that the dielectric foam fill material completely fills the volume of the inner hollow region $5b_2$ so that the structural reinforcement provided is maximized.

The dielectric foam material has dielectric constant at 10 GHz between that of air which at 1 atm is about 1.006, to less than (<) 1.3, generally to <1.2. In one embodiment the dielectric constant of the foam material is from 1.02 to 1.08. For example, the dielectric foam material can comprise a polystyrene foam or a polymethacrylimide foam. One example polymethacrylimide foam is a commercially available foam marketed as ROHACELL® HF which has a dielectric constant at 10 GHz between 1.046 for ROHACELL 31 HF, and a dielectric constant at 10 GHz between 1.067 to 1.093 for other ROHACELL formulations.

Foam filled antenna 5 is shown including a dielectric end cover 5c that together with the outer solid dielectric material $5b_1$ of rod-shaped portion 5b encapsulates the foam fill material. The outer solid dielectric material $5b_1$ is shown including a thickness transition region, wherein a thickness of the solid dielectric material $5b_1$ decreases toward the antenna launch end to a constant minimum thickness shell region $5b_1'$ that extends to the dielectric end cover 5c on the antenna launch end. The outer solid dielectric material $5b_1$ defines an inner hollow region $5b_2$ that is filled by a dielectric foam fill material. The outer solid dielectric material $5b_1$ together with the dielectric end cover 5c cover and thus encapsulate the outer surface of the foam filled dielectric antenna 5. The solid dielectric material $5b_1$ and dielectric end cover 5c can each comprise a fluoroplastic polymer material such as comprising polytetrafluoroethylene (PTFE).

Covering the outer surface of the filled dielectric antenna 5 with a material resistant to corrosion, as well as being a non-stick and hydrophobic coating material, such as generally provided by some fluoroplastic polymer material including PTFE, polyphenylenesulfid (PPS), polyetheretherketone (PEEK), fluorinated ethylene propylene (FEP), or perfluoroalkoxy (PFA), can extend the lifetime of a disclosed antenna combination 200 by eliminating deposits and condensation within the foam filled antenna 5 and reduce deposits and condensation on the surface of the foam filled antenna 5 which known to occur for conventional hollow dielectric antenna during operation with the tank.

Fluoroplastic materials being non-stick and hydrophobic materials help avoid or reduce adhering effects by reducing or eliminating deposits which reduces or eliminates condensation, avoiding changes in the antenna that would otherwise result in degraded performance. Fluoroplastic and similar materials such as polypropylene or polyethylene address this problem by making the antenna to function in as a drip-off manner by having a fluoroplastic material surface cover, thereby minimizing the amount of deposit that will adhere to the antenna to reduce condensation on the antenna surface.

The outer surface of the feed-through 3' is also shown including an optional outer coating shown as 3a'. The optional outer coating 3a' can be helpful for anti-corrosion when the product material in the tank is corrosive and there is a leak from the bottom sealing. The outer surface of the feed-through 3' together with the dielectric covered outer surface of the foam filled antenna 5 results in the antenna combination 200 other than the input side of the connector 115 of the feed-through 3' and most of the flange 4 shown including a material resistant to corrosion, as well as being a non-stick and hydrophobic coating material, such as provided by PTFE.

Figure 2B:
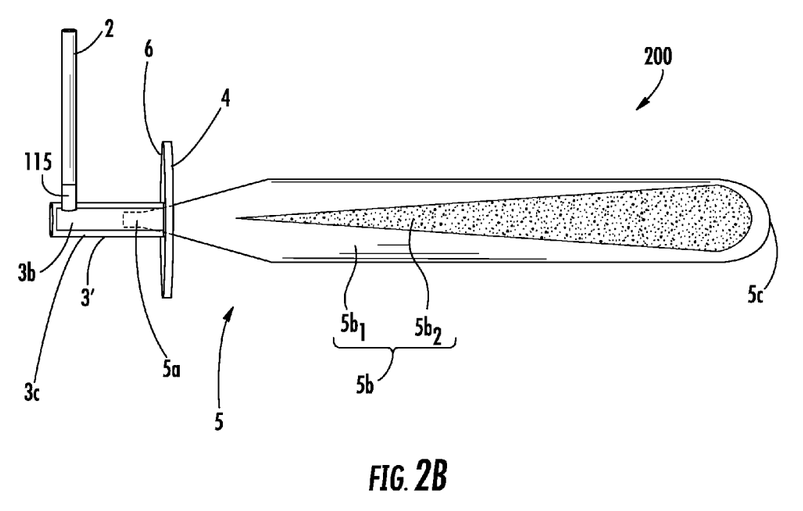
FIG. 2B is a sectional view of the section view of the antenna combination shown in FIG. 2A.

FIG. 2B is a sectional view of the section view of the antenna combination 200 shown in FIG. 2A. The antenna combination 200 having is shown having a transmission line connector 2 such a coaxial cable coupled to connector 115 of the coaxial feed-through 3. Coaxial feed-through is shown including inner conductor 3b and outer conductor 3c. Antenna combination 200 is shown including a flange 4 that can function as a nozzle flange and include the installation flange 6 thereon as shown. The installation flange 6 is configured to match with the size of the nozzle and generally has several holes on its periphery so that bolts can be used to fasten the installation flange 6 to the flange 4.

FIG. 3 is an exploded view of the example antenna combination 300 including a disclosed foam filled antenna 5, according to an example embodiment. Foam filled antenna 5 is shown in three (3) pieces including nose portion 5a, rod-shaped portion 5b and dielectric end cover 5c. The feed-through 3 is shown coupled to the metal flange 4 with its inner cavity 9 indicated. For assembly, the nose portion 5a can be inserted into the inner cavity 9 and can be secured to the holes shown in the flange 4 by suitable fasteners, such as by bolts. The rod-shaped portion 5b having the front side connector shown as 5b' can be inserted into the nose portion 5a. The dielectric end cover 5c can then be secured to the launch end of the rod-shaped portion 5b to encapsulate the dielectric foam fill material. Although as noted above generally being described as separate components, in practice the feedthrough 3' (without its outer metallic conductor 112) and the foam filled antenna 5 including the nose portion 5a and rod-shape portion 5b can be made in one piece. The connector 115 of the coaxial feed-through 3 is shown that is configured for receiving a transmission line connector 2 such as a coaxial cable that provides a 50 ohm impedance.

Disclosed embodiments include methods for forming foam filled antennas, comprising providing a dielectric rod having an outer solid dielectric material including a thickness transition region, where the outer solid dielectric material defines a tapered inner hollow region. The hollow region can be formed by a drilling tool. The tapered inner hollow region is filled with a solid foam material filling having a dielectric constant at 10 GHz from that of air at 1 atmosphere to generally less than (<) 1.2. A dielectric end cover is then attached that together with the outer solid dielectric material encloses and thus encapsulates the dielectric foam material.

There are several ways to fill the tapered inner hollow region with foam material. one embodiment comprises liquid foam precursor injection followed by curing. A liquid foam precursor (e.g., monomer) upon curing will become solid filling the tapered inner hollow region to allow the dielectric rod antenna withstand higher pressure. Other filling methods include cut and fit (insertion) which involves machining a solid foam material with precision to form a foam insert that has a shape configured to fit inside the tapered inner hollow region, with the same method being available for forming the dielectric end cover (or cap). In this way, disclosed foam filled antennas can be used for higher pressure applications as compared to conventional hollow dielectric rod antennas up to about 160 bar, as they are rendered mechanically stronger by foam filling to approach the strength of a uniformly solid rod antenna.

Moreover, the performance for disclosed filled dielectric antennas may be improved as compared to solid rod antenna. Modeling and testing has shown an improvement in Half-Power Beam Width (HPBW) and directivity, with the reason being confining the electric fields better rather than earlier radiation on the antenna due to enhanced electromagnetic fields in the waveguide provided by the dielectric foam fill material as described above. The bottom (launch end) of the hollow rod antenna can be encapsulated with a dielectric end cover 5c comprising the same material (e.g., PTFE) as the rod-shaped portion 5b which provide the outer solid dielectric material side walls for the filled dielectric antenna. After assembling the nose portion 5a, the rod-shaped portion 5b and dielectric end cover 5c together, or as described above providing one piece including the nose portion 5a and the rod-shaped portion 5b of the foam filled antenna 5 and optionally also the feed-through 3' (3' without metallic conductor), these respective components can be molded together or the one-piece molded over and be cut can be at any section along antenna length, with the mold over optionally extending over the polymer part of feed-through 3' too as disclosed above.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. An antenna combination, comprising:
   a feed-through having an input side including a connector for coupling to a transmission line connector and an output side attaching to an aperture in a top surface or a nozzle of a storage tank, said output side including an inner cavity;
   a foam filled dielectric rod antenna (foam filled antenna) coupled to said output side of said feed-through configured for launching electromagnetic waves into said storage tank and receiving reflected electromagnetic waves from a product material in said storage tank, said foam filled antenna including:
      a nose portion including a sub-portion positioned within said inner cavity;
      a rod-shaped portion extending from beyond said inner cavity to an antenna launch end opposite said nose portion,
      wherein said rod-shaped portion includes an outer solid dielectric material including a thickness transition region,
      wherein a thickness of said outer solid dielectric material decreases toward said antenna launch end to a constant minimum thickness shell region that extends to said antenna launch end, said outer solid dielectric material defining an inner hollow region, and
      a dielectric foam fill material filling said inner hollow region.

2. The antenna combination of claim 1, wherein said antenna launch end further comprises a dielectric end cover that together with said outer solid dielectric material encloses said dielectric foam material.

3. The antenna combination of claim 1, wherein said thickness of said outer solid dielectric material in said thickness transition region is linearly tapered.

4. The antenna combination of claim 1, wherein said connector protrudes from said feed-through, and wherein said antenna combination is encapsulated except for an exposed portion of said connector that provides an input to said connector.

5. The antenna combination of claim 1, wherein said storage tank includes said nozzle and a metal nozzle flange, and wherein said feed-through is welded to said metal nozzle-flange or to a metal installation flange on said metal nozzle flange.

6. The antenna combination of claim 1, wherein said storage tank is a nozzle-less tank, and wherein said feed-through is threaded over said aperture in said top surface of said storage tank.

7. The antenna combination of claim 1, wherein said outer solid dielectric material comprises polytetrafluoroethylene (PTFE), perfluoroalkoxy polymer resin (PFA), polyphenylene sulfide (PPS), polyetheretherketone (PEEK), fluorinated ethylene propylene (FEP), perfluoroalkoxy (PFA), polypropylene, or polyethylene.

8. The antenna combination of claim 1, wherein said dielectric foam material has a dielectric constant at 10 GHz from that of air at 1 atmosphere to less than (<) 1.2.

9. The antenna combination of claim 8, wherein said dielectric constant is from 1.02 to 1.08.

10. The antenna combination of claim 9, wherein said dielectric foam material comprises a polystyrene foam or a polymethacrylimide foam.

11. The antenna combination of claim 1, wherein said foam filled antenna further comprises a single over-molded encapsulating layer.

12. The antenna combination of claim 1, wherein said transmission line connector comprises a coaxial connector, a SubMiniature version A (SMA) connector, a Sub Miniature Push-on (SMP) connector, or a 2.92 mm/K connector.

13. A method for forming a foam filled dielectric rod antenna (foam filled antenna), comprising:
   providing a dielectric rod having an outer solid dielectric material including a thickness transition region, said outer solid dielectric material defining a tapered inner hollow region;
   filling said tapered inner hollow region with a solid foam material, and
   adding a dielectric end cover that together with said outer solid dielectric material encloses said dielectric foam material.

14. The method of claim 13, wherein said filling comprises:
   injecting a liquid foam precursor into said tapered inner hollow region, and
   curing said liquid foam precursor to provide said solid foam material.

15. The method of claim 13, further comprising drilling a solid dielectric rod to form said tapered inner hollow region.

16. The method of claim 13, wherein said solid foam material has a dielectric constant at 10 GHz from that of air at 1 atmosphere to less than (<) 1.2.

17. The method of claim 16, wherein said dielectric constant is from 1.02 to 1.08.

18. The method of claim 13, further comprising over-molding to encapsulate said foam filled antenna.

19. A non-contact radar system for level sensing of a product material in a storage tank, comprising
   an antenna combination positioned at a top surface or a nozzle of said storage tank, including:
      a feed-through having an input side including a connector for coupling to a transmission line connector and an output side attaching to an aperture in said top surface or said nozzle of said storage tank, said output side including an inner cavity;
      a foam filled dielectric rod antenna (foam filled antenna) coupled to said output side of said feed-through configured for launching electromagnetic waves into said storage tank and receiving reflected electromagnetic waves from a product material in said storage tank, said foam filled antenna including:

a nose portion including a sub-portion positioned within said inner cavity;

a rod-shaped portion extending from beyond said inner cavity to an antenna launch end opposite said nose portion, wherein said rod-shaped portion includes an outer solid dielectric material including a thickness transition region, wherein a thickness of said outer solid dielectric material decreases toward said antenna launch end to a constant minimum thickness shell region that extends to said antenna launch end, said outer solid dielectric material defining an inner hollow region, and a dielectric foam fill material filling said inner hollow region;

a processor coupled to a transceiver coupled by said transmission line connector to said connector of said feed through for transmitting electromagnetic pulses and receiving reflected electromagnetic pulses after reflecting from said product material in said storage tank.

20. The system of claim 19, wherein said dielectric foam material has a dielectric constant at 10 GHz from that of air at 1 atmosphere to less than (<) 1.2.

* * * * *